2,893,855
N-1-NAPTHYLCHLOROPHTHALAMIC HERBICIDES

Allen E. Smith, Oxford, and Albert W. Feldman, New Haven, Conn., assignors to United States Rubber Company, New York, N.Y., a corporation of New Jersey No Drawing. Application February 24, 1953
Serial No. 338,613

16 Claims. (Cl. 71—2.6)

This invention relates to new and useful improvements in herbicides.

The use of herbicides in agriculture is rapidly increasing and has now reached the point where it is common practice to treat the soil either before or shortly after the crop has been planted, and in some cases after the plants have appeared above the ground but before appreciable plant growth, to eliminate or retard the growth of weeds. Mechanization of the weeding of certain crops is limited since row weeding still necessitates the use of hand labor. Selective herbicides that could be applied to the planted row to curtail or eliminate weeds and yet allow the normal development of the crop would be a tremendous impetus to mechanization of the growing of cotton, legumes, and many other crops. Certainly chemical weed control under any system of farming, whether mechanized or not, can provide a means of assuring good crop development with a saving of expensive hand labor. Several requirements on the part of the chemical must be met in order to justify its use as a selective pre-emergence herbicide. Lack of injury to the agronomic crop is, of course, necessary. Further, it is very important that the chemical render a high degree of weed control, even under very adverse conditions, until the agronomic crop has developed to the stage where mechanical cultivation can be practiced.

U.S. Patent 2,556,665 discloses the use of N-aryl phthalamic acids and their alkali salts and esters as plant growth regulants and phytocides. The herbicidal usefulness of these compounds, however, is limited because they tend to injure many crops when used in amounts sufficient to give practical weed control.

We have found that N-1-naphthylmonochlorophthalamic acid and N-1-naphthyldichlorophthalamic acid are excellent selective pre-emergence herbicides and give effective weed control without crop injury. The N-1-naphthylchlorophthalamic acids of the present invention are new chemicals. The herbicides of the present invention may be used as herbicides in the form of the free acids, esters, or salts, such as alkali (i.e. alkali-metal, ammonium or amine) salts, or polyvalent metal salts. Unless otherwise indicated, reference to the acids herein also includes the salts and esters as well as the free acids.

The herbicides of the invention may be applied to the ground before or after planting as a dust in admixture with a powdered solid carrier, such as the various mineral silicates, e.g. mica, talc, pyrophyllite and clays, or as a spray in aqueous solution or suspension, preferably with the addition of a surface-active wetting agent. Such surface-active agent may be anionic, non-ionic or cationic, as shown in U.S. Patent 2,556,665. The chemicals may be mixed with powdered solid carriers, such as mineral silicates, together with a surface-active agent so that a readily wettable powder may be obtained which may be applied directly to the ground, or which may be shaken up with water for application to the ground in that form. The chemicals may be applied to the ground by the aerosol method.

The N-1-naphthylchlorophthalamic acids of the present invention may readily be prepared by reacting equal molar amounts of 1-naphthylamine with the selected chlorophthalic anhydride in an inert solvent at room temperature. The alkali salts may readily be formed directly from the acid and a suitable base such as an alkali-metal hydroxide or carbonate, or ammonia, or an amine. Polyvalent metal salts may be made indirectly, for example, from an alkali salt of the N-1-naphthylchlorophthalamic acid, and a water-soluble salt of the desired polyvalent cation. Copper, zinc, iron, lead, aluminum and calcium salt, for example, may be made by this procedure. The esters may readily be formed by the method of Human and Mills (J. Chem. Soc. 1949. Suppl. Issue No. 1; S77–80). Examples of such esters are the methyl, ethyl, isopropyl, n-amyl, cyclohexyl, polyoxyethyleneethyl, 2-phenoxyethyl, 2-chloroethyl, benzyl and phenyl esters.

The following Examples I and II illustrate the preparation of the chemicals of the present invention:

EXAMPLE I

*Preparation of N-1-naphthylmonochlorophthalamic acid*

Technical monochlorophthalic anhydride, a mixture of isomers (54.8 g., 0.3 moles), was slurried in 100 ml. of benzene. A solution of 1-naphthylamine (42.9 g., 0.3 moles) in 100 ml. of benzene was added with agitation. An exothermic reaction took place. After stirring for two hours the white solid product was collected by filtration, washed with cold benzene and dried. Yield 91 grams, 93% of the theoretical amount. Melting range 137–141° C. with evolution of a gas.

EXAMPLE II

*Preparation of N-1-naphthyldichlorophthalamic acid*

Technical dichlorophthalic anhydride, a mixture of isomers (65.1 g., 0.3 mole), was slurried in 100 ml. of benzene. A solution of 1-naphthylamine (42.9 g., 0.3 moles) in 100 ml. of benzene was added, with agitation. A rapid exothermic reaction took place. After stirring for an hour the reaction mixture was filtered, and the solid product was washed well with ligroin. Yield 102 g., 94% of the theoretical amount. Melting range 136–140° C. with evolution of a gas.

EXAMPLE III

Sixteen cc. of 0.25% aqueous suspensions of the N-1-naphthylmonochlorophthalamic acid of Example I and of the N-1-naphthyldichlorophthalamic acid of Example II containing 0.02% of a non-herbicidal surface-active wetting agent, an alkyl-phenoxy polyoxyethylene ethanol (monoether of a polyglycol with an alkylated phenol), were each added to 84 cc. of water and the entire 100 cc. of each suspension was watered onto the surface of the soil in separate 6 inch clay pots immediately after seeds of cotton and pea test plants had been sown. The same concentrations of the N-1-naphthylphthalamic acid of Patent 2,556,665 and wetting agent were watered onto a third similarly planted pot (for comparison of the pre-emergence herbicidal effectiveness of the chemical of the prior art), and the same concentration of wetting agent alone was watered onto a fourth similarly planted pot as a check or blank. The phthalamic acid derivatives were used at a rate of about 20 pounds per acre. The potting soil used contained seeds of weeds, largely crab grass and Johnson grass. Seedlings from the test seeds emerged in 3 to 7 days after planting and soil treatment. Four weeks after planting and soil treatment, the phthalamic acid derivatives were evaluated for weed control, emergence of the cotton and pea crops, and injury of the pea and cotton crops. The weed ratings were based on the following scale:

5—No control
4—1–20% control
3—20–50% control
2—50–80% control
1—80–99% control
0—100% control, no weeds The results of the evaluations are shown in the following table:

| Treatment | Weed Rating | Percent Emergence | | Crop Injury | |
|---|---|---|---|---|---|
| | | Cotton | Peas | Cotton | Peas |
| N-1-naphthylmonochlorophthalamic acid. | 1 | 90 | 95 | None | None. |
| N-1-naphthyldichlorophthalamic acid. | 1 | 90 | 95 | None | None. |
| N-1-naphthylphthalamic acid. | 1 | 40 | 55 | Stunting | Stunting. |
| No Chemical (check) Wetting agent and water only. | 5 | 90 | 95 | None | None. |

The salts and esters may be used as well as the free acids shown in the above as selective pre-emergence herbicides.

It is evident from the above tests that the chemicals of the present invention gave weed control comparable to the N-1-naphthylphthalamic acid of the prior art, yet were far more selective in showing much less injury to the test crops. In fact, the chemicals of the invention did not prevent emergence of the test crops whereas the N-1-naphthylphthalamic acid prevented emergence of about one-half the test crops.

Having thus described our invention, what we claim and desire to protect by Letters Patent is:

1. An N-1-naphthylchlorophthalamic acid selected from the group consisting of N-1-naphthylmonochlorophthalamic acid and N-1-naphthyldichlorophthalamic acid.
2. N-1-naphthylmonochlorophthalamic acid.
3. N-1-naphthyldichlorophthalamic acid.
4. A herbicidal composition comprising an aqueous suspension of N-1-naphthylmonochlorophthalamic acid.
5. A herbicidal composition comprising an aqueous suspension of N-1-naphthyldichlorophthalamic acid.
6. A herbicidal composition comprising N-1-naphthylmonochlorophthalamic acid and a surface-active wetting agent.
7. A herbicidal composition comprising N-1-naphthyldichlorophthalamic acid and a surface-active wetting agent.
8. A herbicidal composition comprising N-1-naphthylmonochlorophthalamic acid and a powdered solid carrier.
9. A herbicidal composition comprising N-1-naphthyldichlorophthalamic acid and a powdered solid carrier.
10. A herbicidal composition comprising N-1-naphthylmonochlorophthalamic acid, a powdered solid carrier and a surface-active wetting agent.
11. A herbicidal composition comprising N-1-naphthyldichlorophthalamic acid, a powdered solid carrier and a surface-active wetting agent.
12. A herbicidal composition comprising an aqueous suspension of N-1-naphthylmonochlorophthalamic acid containing a surface-active wetting agent.
13. A herbicidal composition comprising an aqueous suspension of N-1-naphthyldichlorophthalamic acid containing a surface-active wetting agent.
14. The method of controlling the growth of weeds in soil in which seeds of agronomic crops are planted which comprises treating the soil with an N-1-naphthylchlorophthalamic acid in a concentration and an amount sufficient to effect control of the growth of seeds therein.
15. The method of controlling the growth of weeds in soil in which seeds of agronomic crops are planted which comprises treating the soil with N-1-naphthylmonochlorophthalamic acid in a concentration and an amount sufficient to effect control of the growth of seeds therein.
16. The method of controlling the growth of weeds in soil in which seeds of agronomic crops are planted which comprises treating the soil with N-1-naphthyldichlorophthalamic acid in a concentration and an amount sufficient to effect control of the growth of seeds therein.

References Cited in the file of this patent
UNITED STATES PATENTS

| 2,326,471 | Lontz | Aug. 10, 1943 |
| 2,556,665 | Smith et al. | June 12, 1951 |

OTHER REFERENCES

Tingle et al.: "Journal of the American Chemical Society," vol. 32, page 1326 (1910).
Stamper et al.: "Agricultural News Letter," July-August 1953, page 62.